J. E. OLLIVIER.
TRACTION WHEEL.
APPLICATION FILED FEB. 1, 1918.
1,404,051.
Patented Jan. 17, 1922.
3 SHEETS—SHEET 1.
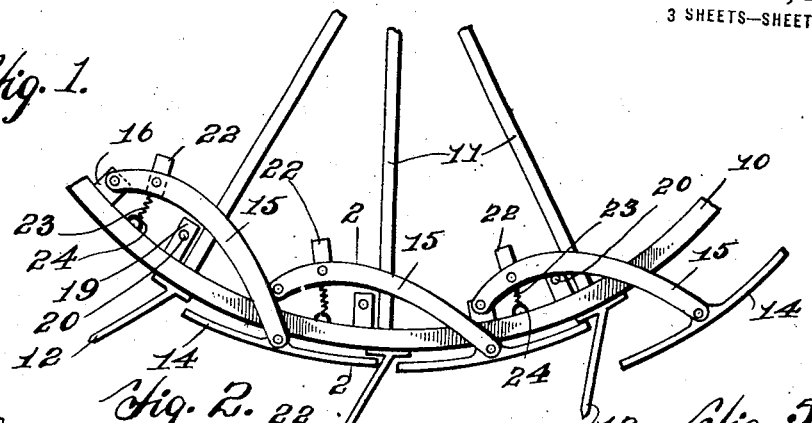
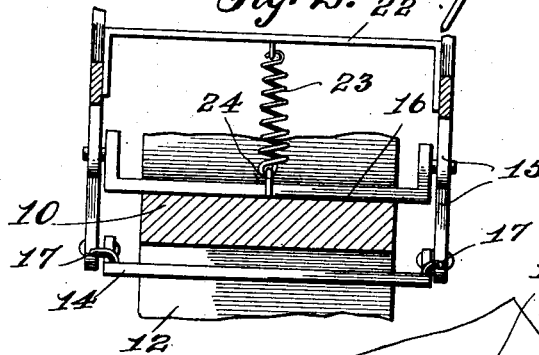
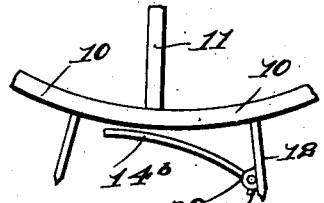
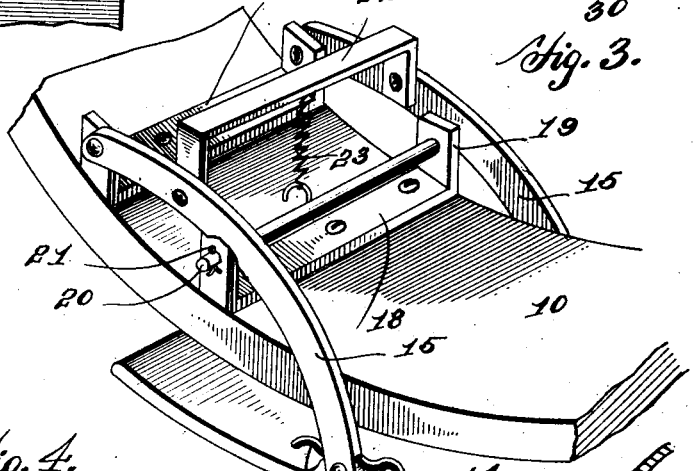
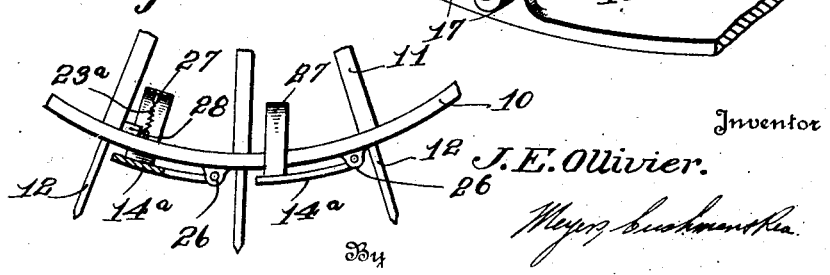
Inventor
J. E. Ollivier.
Attorney

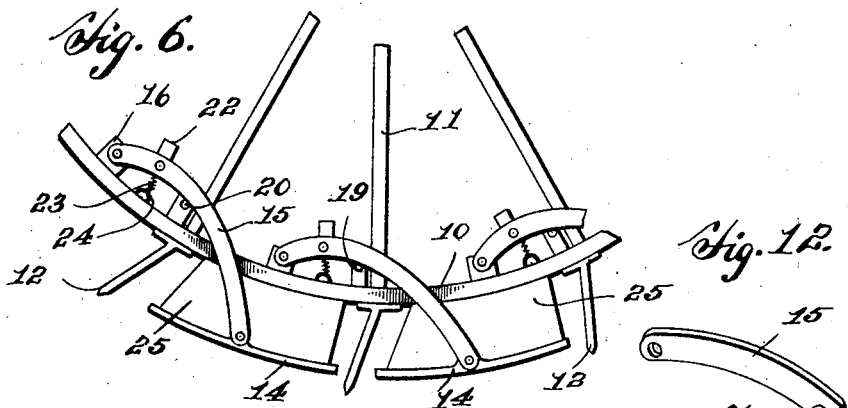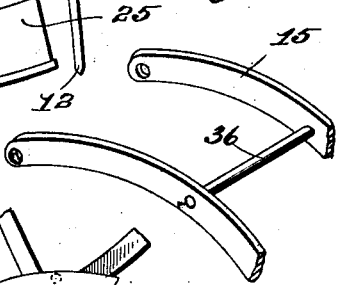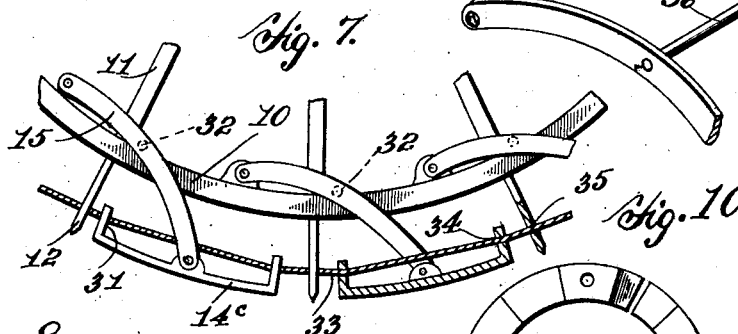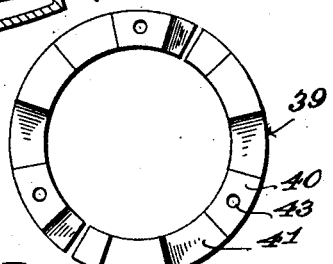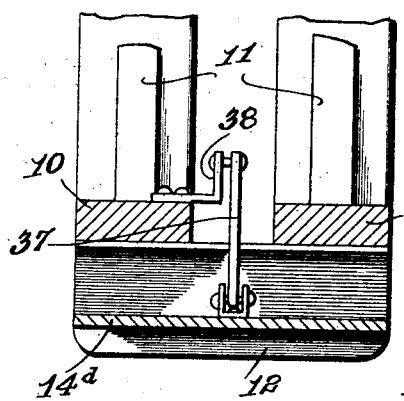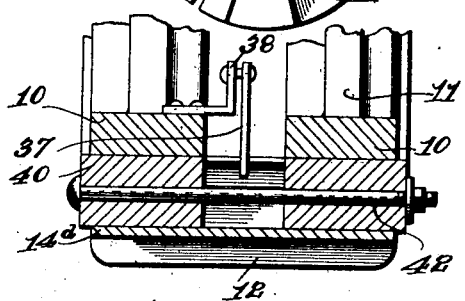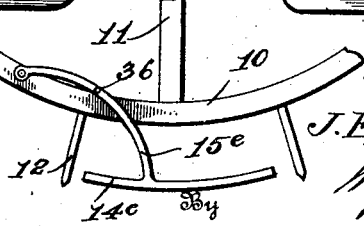

J. E. OLLIVIER.
TRACTION WHEEL.
APPLICATION FILED FEB. 1, 1918.

1,404,051.

Patented Jan. 17, 1922.
3 SHEETS—SHEET 3.

Inventor
J. E. Ollivier.

By

Attorneys

UNITED STATES PATENT OFFICE.

JOCELYN EMILE OLLIVIER, OF HAUTE-SAVOIE, FRANCE.

TRACTION WHEEL.

1,404,051.      Specification of Letters Patent.     Patented Jan. 17, 1922.

Application filed February 1, 1918. Serial No. 214,927.

*To all whom it may concern:*

Be it known that I, JOCELYN EMILE OLLIVIER, a citizen of France, residing at Haute-Savoie, France, have invented new and useful Improvements in Traction Wheels, of which the following is a specification.

This invention relates to traction wheels, and has as its objects to provide a traction wheel with improved ground gripping devices which engage and dig into the ground so that the traction of the wheel is increased and slipping of the wheel on loose, wet surfaces is prevented; and to provide means for preventing the accumulation of mud, dirt, and the like, between the ground gripping devices; the arrangement being such that the means for preventing accumulations may be adjusted to limit the depth or extent to which the ground gripping devices sink into the ground, or to hold the gripping devices out of contact with the ground surface so that the character of the wheel may be changed to adjust it to the particular nature of the ground over which the vehicle is travelling.

The above and other objects of my invention are disclosed in the structure described in the following specification and illustrated in the accompanying drawings,— and wherein—

Figure 1 is a side elevational view of a portion of a wheel to which my improvements are applied.

Figure 2 is a vertical sectional view taken on line 2—2 of Figure 1.

Figure 3 is an enlarged perspective view of a portion of the wheel shown in Figure 1.

Figure 4 is a side elevational view of a wheel showing another embodiment of my invention.

Figure 5 is a view similar to Figure 4 but illustrates a further embodiment of my invention.

Figure 6 is a view similar to Figure 1, but showing the means for preventing accumulation of mud blocked out so that the ground gripping devices sink into the ground to only a small depth.

Figure 7 is a side elevation of a wheel showing a still further embodiment of my invention.

Figures 8 and 9 are vertical sectional views through felly portions of a wheel having two tread surfaces and to which my invention is applied.

Figure 10 is an inside elevational view of a ring for blocking out the means for preventing accumulations between the ground gripping devices, illustrated in Figures 8 and 9.

Figure 11 is a side elevational view of a wheel, showing a slightly different form of my invention.

Figure 12 is a perspective view of a pair of arms which comprise part of the means for preventing accumulations of soil between the ground gripping devices.

Figure 13:
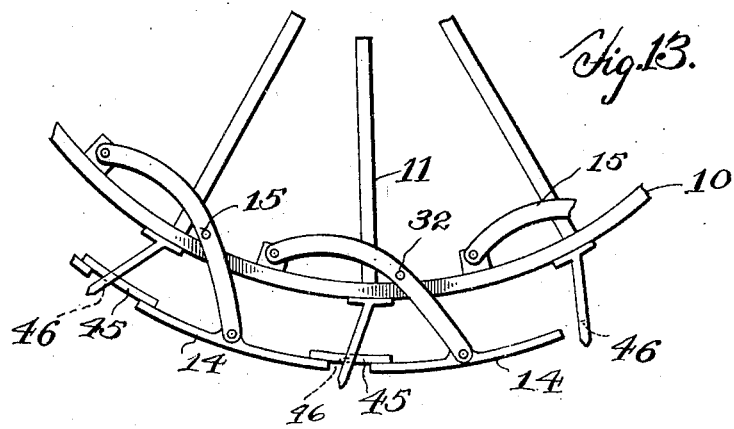
Figures 13 and 14 are side elevational views of wheels to which are applied still different embodiments of my invention.

Referring to the drawings wherein like numerals represent like parts in the several views, 10 designates the felly or rim portion of a wheel and 11 the usual spokes. It is to be understood of course, that the wheel may be of any suitable construction.

The ground gripping devices comprise blades 12 which are constructed from a plate of metal and sharpened at their outer ends so as to readily sink into the surface of the ground. The blades 12 are spaced at equal distances about the periphery of the rim 10, and as shown in Figures 1 and 6, are preferably inclined in the direction of rotation of the wheel away from the radii of the wheel. By thus disposing the blades 12 at an angle to the radii of the wheel, the blades sink in a single plane into the ground. The blades may of course extend radially from the rim 10 as shown in Figure 4, but in this case, the blades are subjected to considerable strain as the forward faces of the blades are brought to bear forcibly against the soil.

For the purpose of preventing the accumulation of soil between the blades 12, I provide means between the blades which swing outwardly during rotation of the wheel to which the blades are attached. This means in the embodiment disclosed in Figures 1, 2, 3 and 6, comprises, in part, plates 14 of substantially the same width as the rim 10 and preferably curved longitudinally so as to be concentric to the curvature of the rim. Each of the plates 14 is pivotally carried by a pair of arms 15 which straddle the rim 10 and which at their inner ends are pivoted to the upstanding ears or ends of a U-shaped member 16, secured to the inner periphery of the rim 10. Adjacent the outer ends of the arms 15 are studs or stops 17 which are curved into the path of rotation of the plates 14 so as to limit pivotal movement thereof.

Secured to the inner periphery of the rim 10 and intermediate the ends of the arms 15 are U-shaped members 18, the upstanding ends or ears 19 of which are provided with through-registering openings. Extending through the openings of the ears 19 is a transverse rod 20, the opposite ends of which extend beyond the U-shaped member 18. The rods 20 are removable and are secured in position by cotter pins 21. The arms 15 of each pair are connected together by means of a yoke 22 which is preferably of U-shape. The free ends of the arms 15 together with the plates 14 carried thereby, are normally urged outwardly of the rim of the wheel by springs 23 secured at one end to the yoke 22 and at its other end to a hook 24 secured to the rim 10.

With the embodiment of my invention disclosed in Figures 1, 2, 3 and 6, during rotation of the wheel, the blades 12 sink into the surface of the ground over which the vehicle is traveling, and there is a tendency for the soil to accumulate between these blades. The plates 14 however, prevent such accumulations, for due to the combined action of the springs 23 and centrifugal force, the plates 14 are thrown outwardly of the wheel. The movement of the plates in an outward radial direction is limited by engagement of the arms 15 against the protruding ends of the rods 20. If desired, the spring 23 may be omitted and centrifugal force relied upon to throw the blades radially outward.

It is desirable when the vehicle is passing over a hard surface into which the blades 12 will not sink, to maintain these blades out of contact with the ground and to accomplish this result the plates 14 are blocked outwardly so as to form a tread surface which is substantially the same radial distance from the center of rotation of the wheel as are the outer ends of the blades 12.

Furthermore, in some cases, it is desirable, especially where the ground is relatively compact and yet sufficiently loose to permit the blades to sink a slight distance therein, to permit only the outer ends of the blades to sink into the ground.

In Figure 6, I have shown blocks 25 positioned between the blades 12 and the rim 10 and the plates 14. The blocks are of sufficient height to permit the outer ends of the blades 12 to protrude beyond the outer surfaces of the plates 14. It is of course evident that where it is desired that the blades 12 dig more deeply into the ground, the blocks 25 would be of less height, and where it is desired that the blades 12 should not dig into the ground at all, the blocks 25 are of a greater height. When inserting the blocks 25 in place between the rim 10 and the plates 14, the rod 20 is removed from the ears 19 of the U-shaped member 18, to permit the plates 14 to be swung outwardly from between the blades 12.

In the embodiment of my invention disclosed in Figure 4, I have illustrated the plates 14$^a$ as being pivoted at one end to ears 26 carried on the outer periphery of the rim 10. Connected to the inner surfaces of the free ends of the plates 14$^a$ are yokes 27 which surround the rim 10 and these yokes are of sufficient height to permit the plates 14$^a$ to move about their pivots. Within the yokes 27 and connecting the yokes to the rim 10 are springs 23$^a$ which urge the yokes and plates outwardly of the wheel. Pivotal movement of the plates 14$^a$ in an outward direction is limited by stops 28 mounted on the inner periphery of the rim 10 and against which the yokes 27 engage. In Figure 5, the plates 14$^b$ are pivotally mounted in ears 29 located on one side of the blades 12 adjacent the outer ends of the latter. In this embodiment springs are not employed for throwing the plates 14$^b$ outwardly, and centrifugal force alone is relied upon to move these plates away from the rim 10. Swinging movement of the plates 14$^b$ in an outward direction is limited by the stops 30 which engage against the blades 12.

In the embodiment of my invention disclosed in Figure 7, the plates 14$^c$ have inturned flanges 31 at their opposite ends. The plates are pivotally carried by pivoted arms 15 which are similar in construction to the like arms shown in Figures 1, 2 and 3. In this embodiment, however, the yoke 22 and the spring 23 are omitted. Swinging movement of the plates 14$^c$ in an outward direction is limited by studs 32 shown in dotted lines, and these studs engage against the inner periphery of the rim 10 as clearly shown in Figure 7. Instead of maintaining the plates 14$^c$ in spaced relation relative to the rim 10 by means of blocks 25 as shown in Figure 6, I employ in this embodiment cables 33 which are threaded through openings 34 in the flanges 31 of the plates and openings 35 in the blades 12. If desired, in place of using studs 32, a rod 36 connecting the arms 15 as shown in Figure 12 may be employed. In Figures 8, 9 and 10, I have shown a slightly different form of my invention applied to a wheel having a pair of spaced apart tread surfaces, this type of wheel being generally known as the twin type. In this embodiment the plates 14$^d$ are each carried by an arm 37 located in the space between the tread surfaces or rims 10 of the twin wheel and pivotally connected at its inner end to the bracket 38 secured to one of the rims 10. For the purpose of maintaining the plates 14ᵈ in spaced apart relation from the rims 10, I provide a pair of rings 39, one of these rings being shown in elevation in Figure 10. Each of these rings is divided into two sections as shown in Figure 10, and has on one of its surfaces, projections 40 and intervening recesses 41. In mounting the rings 39 upon the wheels, they are inserted from opposite sides thereof with recessed surfaces in opposed relation, and the recesses 41 receive or accommodate the blades 12 and the bosses 40 are positioned between the plates 14ᵈ and the rims 10. The rings 39 are held in assembled position upon the wheel by means of bolts 42 which pass through the openings 43 in the bosses 40.

In Figure 11 I have shown another form of my invention in which the plates 14ᵉ are integral with the arms 15ᵉ. The arms 15ᵉ are connected together within the rim 10 by means of a rod 36.

Figure 14:
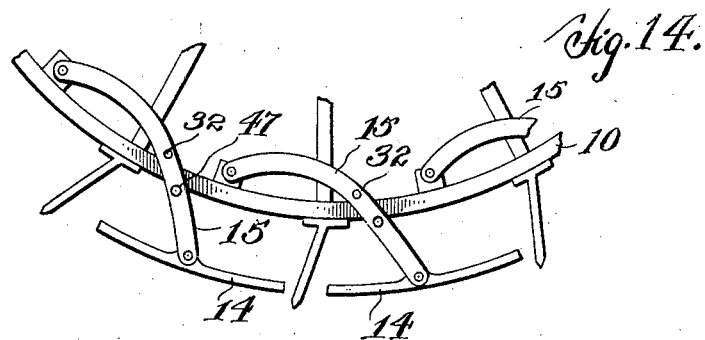
Figure 15:
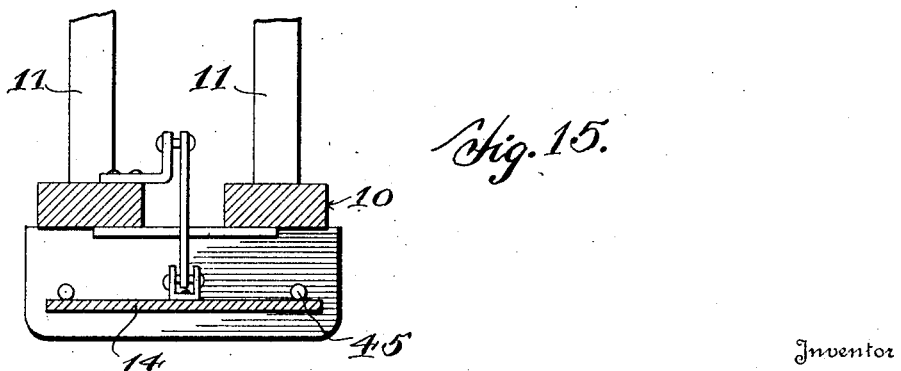
Figure 15 is a view similar to that of Fig. 8 but illustrates another form of my invention.

In Figures 13 and 14 the structures are similar to that shown in Figure 7 except that different means are provided for maintaining the plates 14 in adjusted position relative to the felly 10. In Figure 13, this means comprises pins or bars 45 located in openings 46 in the blades. The bars 45 project into the spaces between the blades and beneath the plates 14. In Figure 14 each of the plates 14 is maintained outwardly of the felly 10 by means of a rod 47 removably connected to the arms 15 at a point radially beyond the felly 10. In operation, the rods 47 bear against the outer circumference of the felly to prevent the plates from swinging inwardly, while the studs 32 prevent the plates from swinging outwardly. In Figure 15, I have illustrated that form of my invention shown in Figure 13, applied to a twin or double wheel.

It is of course obvious that the several forms of my invention may be combined and that my invention is susceptible of various modifications and changes which will be within the spirit of the invention, and without departing from the scope of the claims.

I claim—

1. A tractor wheel having outwardly and transversely extending blades, plates between said blades and pivotally connected to said wheel and yielding means for moving said plates relatively to the wheel.

2. A tractor wheel having a rim, blades extending outwardly from and transversely of said rim, plates between said blades, and means for pivoting said plates to the wheel so as to permit the same to freely swing outwardly of the rim and prevent accumulation of soil between the blades.

3. A tractor wheel having a rim, a plurality of blades extending from the rim and adapted to dig into the ground, plates between said blades curved concentrically to said rim, and means for pivotally connecting the plates to the wheel so as to permit the same to swing outwardly and prevent accumulation of soil between the blades.

4. A tractor wheel having a rim, spaced blades extending outwardly from said rim and adapted to dig into the ground, a plurality of plates, each plate being between a pair of adjacent blades, a pivotal connection between each plate and said wheel, means for limiting the pivotal movement of the plates, and yielding means adapted to urge said plates outwardly from the rim.

5. A tractor wheel having a rim, blades extending outwardly from and transversely of said rim, plates between said blades, means for pivotally connecting said plates to the wheel so as to permit the same to swing outwardly of the rim under the influence of centrifugal force and prevent accumulation of soil between the blades, and additional means for normally urging said plates outwardly from the rim.

6. A tractor wheel having a rim, a plurality of blades extending from the rim and adapted to engage and dig into the surface of the ground, plates between said blades, arms carrying said plates and pivotally connected to said rim, and springs for urging said plates outwardly of the rim.

7. A tractor wheel having outwardly and transversely extending blades, plates between said blades freely pivoted to said wheel, and means for limiting the outward swinging movement of said plates.

8. A tractor wheel having a rim, blades extending outwardly from and transversely of said rim, plates between said blades, means for pivotally connecting said plates to the wheel so as to permit the same to freely swing outwardly of the rim and prevent accumulation of soil between the blades, and removable stops for limiting the outward swinging movement of said plates.

9. A tractor wheel having a rim, a plurality of blades extending from the rim and adapted to engage and dig into the surface of the ground, plates between said blades, arms pivotally connected to said rim and to which said plates are pivotally connected, and means on the arms for engaging said plates to limit the pivotal movement of the plates relative to the arms.

10. A tractor wheel having a rim, a plurality of blades extending outwardly from the rim and adapted to engage and dig into the surface of the ground, plates between said blades, arms pivotally connected to said rim and pivotally carrying said plates, removable rods carried on the rim and against which the arms are adapted to engage to limit the outward movement of the plates, and springs between the arms and the rim for urging said plates upwardly.

11. A tractor wheel having a rim, blades extending outwardly from said rim, a plate between said blades, arms carrying said plate at their outer ends and straddling said rim, means for pivotally connecting the inner ends of said arms to the wheel and means for maintaining said plates spaced from said rim.

12. A tractor wheel having a rim, blades, plates between said blades, arms carrying said plates, means for pivotally connecting the arms to said wheel, and spacing members for maintaining the plates at a fixed distance from the outer periphery of the wheel.

13. A tractor wheel having a rim, a plurality of blades extending outwardly from and transversely of said rim, said blades being adapted to dig into the ground, plates between said blades, arms pivotally connected to said rim and carrying said plates, stops adapted to limit the outward movement of the plates and means for normally urging said plates outwardly from the rim.

14. A tractor wheel having a rim, a plurality of blades extending outwardly from and transversely of said rim, said blades being adapted to dig into the ground, plates between said blades curved concentrically with relation to said rim, arms pivotally connected to said rim and pivotally carrying said plates, stops adapted to limit the outward movement of the plates and means for normally urging said plates outwardly from the rim.

15. A tractor wheel having a rim, a plurality of blades extending outwardly from and transversely of said rim, said blades being adapted to dig into the ground, plates between said blades curved concentrically with relation to said rim, arms pivotally connected to said rim and pivotally carrying said plates, removable stops adapted to limit the outward movement of the plates, means for normally urging said plates outwardly from the rim and spacing means for maintaining the plates at a fixed predetermined distance from the outer periphery of the wheel.

In testimony whereof I have hereunto set my hand.

JOCELYN EMILE OLLIVIER.